United States Patent
Mizrah

(10) Patent No.: US 7,379,916 B1
(45) Date of Patent: May 27, 2008

(54) SYSTEM AND METHOD FOR PRIVATE SECURE FINANCIAL TRANSACTIONS

(75) Inventor: Len L. Mizrah, San Carlos, CA (US)

(73) Assignee: Authernative, Inc., Walnut Creek, CA (US)

( * ) Notice: Subject to any disclaimer, the term of this patent is extended or adjusted under 35 U.S.C. 154(b) by 1555 days.

(21) Appl. No.: 09/706,370

(22) Filed: Nov. 3, 2000

(51) Int. Cl.
G06Q 40/00 (2006.01)
G07F 19/00 (2006.01)
G06F 5/00 (2006.01)

(52) U.S. Cl. .................... 705/44; 705/38; 705/39; 235/379; 235/380

(58) Field of Classification Search ............. 705/44, 705/50, 75, 79, 38, 39, 13, 1, 35; 707/100; 902/22, 1, 2, 7, 11; 713/201; 380/23–25, 380/4, 9; 379/145; 235/379, 380, 382
See application file for complete search history.

(56) References Cited

U.S. PATENT DOCUMENTS

| | | | | |
|---|---|---|---|---|
| 5,311,594 | A | * 5/1994 | Penzias | 713/183 |
| 5,485,510 | A | 1/1996 | Colbert | 379/145 |
| 5,826,245 | A | * 10/1998 | Sandberg-Diment | 705/44 |
| 5,870,721 | A | 2/1999 | Norris | 705/38 |
| 5,956,699 | A | 9/1999 | Wong et al. | 705/39 |
| 5,974,148 | A | 10/1999 | Stambler | 380/25 |
| 5,991,750 | A | 11/1999 | Watson | |
| 6,018,717 | A | 1/2000 | Lee et al. | 705/13 |
| 6,021,202 | A | * 2/2000 | Anderson et al. | 705/54 |
| 6,021,399 | A | 2/2000 | Demers et al. | 705/39 |
| 6,029,150 | A | 2/2000 | Kravitz | 705/39 |
| 6,047,268 | A | 4/2000 | Bartoli et al. | 705/35 |
| 6,047,270 | A | * 4/2000 | Joao et al. | 705/44 |
| 6,052,675 | A | 4/2000 | Checchio | 705/44 |
| 6,085,320 | A | 7/2000 | Kaliski, Jr. | |
| 6,092,202 | A | 7/2000 | Veil et al. | 713/201 |

(Continued)

FOREIGN PATENT DOCUMENTS

GB    2 352 861 A    2/2001

(Continued)

OTHER PUBLICATIONS

Orbiscom Aims To Foil Net Fraud. (Company Business and Marketing); Bank Technology News; V.13; n.6; Jun. 2000; pp. 1-5.*

(Continued)

*Primary Examiner*—Ella Colbert
(74) *Attorney, Agent, or Firm*—Haynes Beffel & Wolfeld LLP

(57) ABSTRACT

A clocked authentication, authorization and accounting (CAAA) system and method offers private and secure credit/debit card online and offline financial transactions (FT) including an embedded privacy and security layer (EPSL) architecture. EPSL includes an authentication stage prior to the authorization stage that is automated and enabled through a back office, and enhanced by associating the authentication stage with projected timing, security and accounting parameters. It enables legal financial account holders to perform buy/sell or withdraw/deposit transactions without disclosing private personal information to the transaction counterparts, while preserving highly elevated and enhanced security and fraud protection as compared with conventional methods. The CAAA method enables efficient mass user EPSL implementation at back offices utilizing high frequency synchronized global clocking of EPSL logic blocks.

10 Claims, 12 Drawing Sheets

U.S. PATENT DOCUMENTS

| | | | | |
|---|---|---|---|---|
| 6,095,413 A | * | 8/2000 | Tetro et al. | 235/380 |
| 6,098,053 A | | 8/2000 | Slater | |
| 6,098,675 A | | 8/2000 | Runft | 141/81 |
| 6,178,409 B1 | * | 1/2001 | Weber et al. | 705/79 |
| 6,189,098 B1 | | 2/2001 | Kaliski, Jr. | |
| 7,136,835 B1 | * | 11/2006 | Flitcroft et al. | 705/39 |

FOREIGN PATENT DOCUMENTS

| | | | |
|---|---|---|---|
| WO | WO 97/00483 | * | 1/1997 |
| WO | WO 00/42486 | | 7/2000 |

OTHER PUBLICATIONS

Mandell "*The Credit Card Industry A History*" Twayne Publishers, Boston 1990 pp. ix-xxiv, 16-17, 52-53, 58-59, 64-67, 78-79, 100-101, 126-127, 130-131, 138-141, 150-155.

Rosenberg "*Dictionary of Banking*" John Wiley & Sons, Inc., New York, 1993 pp. vii-viii, xi-xii, 5, 20, 52, 59, 90, 146, 154, 344, 367-369.

* cited by examiner

| EPSL PROTOCOL ITEMS DELIVERED TO FI BACK OFFICE (CPU & dB) | AUTHEN-TICATION SESSION | AUTHO-RIZATION SESSION | ACCOUN-TING SESSION |
|---|---|---|---|
| ACC#{XYZ} | + | + | - |
| (W/D)_PIN | + | - | - |
| ID_PIN SUBSET | + | - | - |
| (W/D)$ | + | - | - |
| (W/D)#_GEN(ACC#{XYZ}, TX1) | + | + | + |
| T_INT(ACC#{XYZ}, TX1) | + | - | - |
| ACC#{XYZ}_TX1 | + | + | + |
| ACC#{XYZ}_TX2 | - | + | + |
| BUS# | - | + | + |
| T-AMOUNT | - | + | + |

FIG. 8

SYSTEM AND METHOD FOR PRIVATE SECURE FINANCIAL TRANSACTIONS

BACKGROUND OF THE INVENTION

1. Field of the Invention

The present invention relates to a system and method for providing a private and secure transaction environment.

2. Description of the Related Art

Basic financial transactions including buy and sell transactions and withdraw and deposit transactions, have always required security to protect the account holder, the financial institution where the account resides, and a party at the point of sale from identity theft and fraudulent transactions. Due to widespread use of computer networks and electronic commerce as a new medium to perform transactions, new requirements to maintain validity and integrity of financial transactions are arising. There are companies violating consumer privacy by gathering, sorting, researching and selling for profit personal information about consumers acquired during financial transactions. It would be advantageous to provide an efficient system and method to protect customers' privacy during financial transactions. Another new requirement is associated with the fact that hackers and intruders may get illegal access to the computer network and compromise financial transactions. This aspect of transaction security is addressed in U.S. Pat. No. 6,092,202 to Veil et al.

Throughout the history of financial transactions, privacy and security have been addressed using the best contemporary technologies. Since the onset of the computer network era, computer power, relational databases, software environments and communication lines have been used by financial institutions for security and privacy functions. Banks, then credit card companies and eventually brokerage companies and other financial institutions have used computer systems to perform authentication, authorization and accounting, referred to as AAA, at their back offices during financial transactions.

Due to weaknesses in the authentication stage in financial transactions with credit cards, consumers have suffered significant losses. The authentication stage is based on a party at the point of sale who compares human signatures visually on a card (if there is any) and on a selling slip. This operation is error prone when identifying faked signatures in fraudulent actions. Also, if an account holder loses an unsigned credit card, it is easy to fake signatures as one can place any signature on a card before requesting a financial transaction. Another typical malfunction at the authentication stage of credit card transactions occurs when someone gets a credit card account number and a copy of the card owner's signature. This enables fraud even with non-stolen credit cards. Another example in which financial institutions incur losses arises when account holders change their minds after concluding a financial transaction. An account holder can repudiate the financial transaction by claiming that somebody acted in his or her place.

These examples show that there is a real and substantial need for improvements in financial transaction architectures at the authentication stage. Mistakes in authenticating fraudulent actors are often followed by successful authorization and accounting sessions at financial institution back offices, illustrating another weakness of the prior art financial transaction architecture. This occurs because the authorization and accounting stages are de-coupled from the actual account holder, while the authentication stages are de-coupled from financial institution back office computers.

Though credit cards have been used as a financial transaction instrument since the beginning of electronic commerce, there are a number of issues in the electronic commerce architecture that have become apparent. For instance, credit card data, a social security number, a card holder name, a phone number, an address etc., while transferred through the Internet, are not absolutely secure and can fall into the "wrong hands" due to communication channel leaks. It is obvious that while the high speed data flow through the Internet or other communication channels is a big advantage for financial transactions, insufficient data security makes it highly desirable to alter the financial transaction architecture to avoid potential data leaks.

Another issue jeopardizing financial transactions in electronic commerce is weakness of the authorization stage in credit card transactions. Neither the authorization stage nor the accounting stage is actively controlled and timed by the account holders. A number of fraudulent sell transactions may happen before the account holder regains control on his/her account after it has been breached. U.S. Pat. No. 5,485,510 to Colbert and U.S. Pat. No. 6,052,675 to Checchio disclose attempts to improve the authorization stage of financial transactions in order to enhance security. The Colbert patent proposed to alter financial transactions by authorizing an account holder before he/she applies to a merchant (a vendor). Information supplied to the back office includes a credit card account number, a secret PIN and information specific to the merchant and the financial transaction (including at least, a merchant ID number and a transaction amount). Then the merchant is given only the authorization code, while the card number and the PIN remain unknown to the merchant. A similar architecture is offered in the Checchio patent, except a merchant does not get any authorization code, but rather a credit card account number. Since the financial transaction is pre-authorized in this case, a merchant sends into the back office a credit card account number and merchant and financial transaction specific information, which are compared with data given by the account holder during the pre-authorization stage. Use of a lost or stolen card is prevented in the Checchio system using a secret PIN.

Though both Colbert and Checchio improve security against fraudulent usage of credit cards for certain types of transactions, there are limitations to be addressed. Both patents are centered on phone lines, when communicating to financial institution back offices. Frequent usage of a pair of static numbers (account numbers and PINs) over phone lines is insecure due to leaks at the line entries and on the lines themselves. This insecure communication line issue gets aggravated, if one would like to replace phone lines by wireless or the Internet communication lines. Another weakness common to both patents is lack of technology enabling the back office to handle the proposed architectural changes for large numbers of financial transactions. Financial transaction architectures ought to cover account holders, financial institutions and a party at the point of sale in a mutually dependent way. Both prior art approaches require knowledge of a party at the point of sale and other financial transaction specifics prior to the authorization stage. This requirement for authorization is an additional limitation in both Colbert and Checchio, narrowing down the types of possible financial transactions and the locations from which they can be performed.

There is a public concern that financial transactions with credit cards in electronic commerce channels and in other traditional channels could lead to personal information about the consumer being accessed, monitored, tracked, stolen and fraudulently used or sold for profit without the consumers' approval. Privacy related problems are exacerbated with the advanced Internet related technologies due to the ease with which information can be collected, processed and combined with other information.

It is not only financial transactions with credit cards that raise numerous privacy issues. For example, an account holder would not always like a bank teller during standard withdraw and deposit transactions at a bank to have access to his/her personal information file. It would be beneficial if an account holder could decide whether this privilege should be given to the bank teller. More often than not, withdraw and deposit transactions at a bank require an account holder to reveal identification documents This requirement to reveal personal identification documents is a privacy related inconvenience justified by the current authentication process for such financial transactions.

FIG. 1A illustrates a block diagram of a conventional system for performing withdraw and deposit transactions. In order to perform financial transactions, a legal adult 101 (or a legal business) sets up an account with a financial institution. Typically, a personal information profile 102 is disclosed to the financial institution during the account application process 103. At step 104, the financial institution, which permitted an account opening, creates a personal log file in the financial institution back office, establishes a withdraw and deposit mechanism, and issues personal checks and cards. Then the account holder can perform deposit 105 or withdraw 106 transactions. Typical deposit transactions to a bank or a brokerage house 107 are made either with a personalized deposit slip 109 or a personal check, disclosing a name and account number. Another way of obtaining deposits used by insurance 117 and credit card companies 115, is to receive payments for account statements 119 from an account holder. Checks 110, debit cards 112 or Graphical User Interfaces (GUI) over the Internet 113 are used by account holders for withdraw transactions with a bank or a brokerage house 108. The credit card 116 is a typical withdraw mechanism for credit card companies (including banks like Visa and Master Card and other types of financial institutions, like American Express). Another withdraw mechanism is used by account holders with insurance companies 118. A request for payment 120 is to be made in accordance with the insurance policy.

There are deficiencies in the deposit and withdraw transaction system described above related to privacy and security of the account holder and the financial institution, including the following:

1) Direct and urgent deposit transactions can be hindered, if the account holder is located far away from the bank and its branches where the account resides. It should be possible to deposit to one's account via other financial institutions, without disclosing personal information at intermediate service levels in other financial institutions.

2) During depositing, bank tellers get access to the personal information of the account holder. There are two issues here. Firstly, a teller can make mistakes altering personal and account balance information without any immediate back office computer and database control. In other words, each deposit transaction has a probability of mistakes, hurting the bank and the account holder. Secondly, the account holder may not like a bank teller to have access to his/her personal information file during a direct deposit transaction. At this stage it would be beneficial, if the account holder could decide by himself/herself whether this privilege should be given to the bank teller.

3) Insufficient theft and fraud protection during withdrawal transactions with checks, credit, charge and debit cards or during electronic commerce financial transactions.

4) Personal information is not protected and often intentionally or unintentionally misused by a party at the point of sale or bank tellers during withdrawal transactions.

FIG. 1B illustrates a block diagram of a conventional system for performing buy and sell transactions. Once account holder 121, has made a buying decision 122 and applied to a party at the point of sale, the actual selling transaction is enabled through cash 124, credit cards 116, debit cards 112, checks 110 or electronic commerce 125. Though cash is handy for low value financial transactions, it is usually impractical for the bulk of financial transactions due to low cash amounts on hand. All other financial transaction instruments except cash, such as credit cards 116, debit cards 112, electronic commerce 125 and checks 110 lead to either complete or partial disclosure of personal information 127, and are therefore prone to misuse and fraudulent actions 128.

FIG. 2 illustrates a block diagram of a conventional system and method for performing authentication, authorization and accounting sessions during buy/sell transactions with a credit card, a charge card or a debit card. As illustrated in FIG. 1B and FIG. 2, once account holder 121 has made a buying decision 122 and applied to a party at the point of sale, a point-of-sale (POS) device scans static information on a credit card and sends an authorization request to the financial institution back office, specifying a price (money transaction amount), to perform a withdraw transaction 205. The back office computer checks whether there is enough money in the database under this account and if yes, then if the card is not marked in the database as lost, stolen or fraudulently used, authorizes the withdraw transaction 206, sending an authorization code to the point of sale POS device. Steps 205 and 206 constitute the authorization stage 201 of the financial transaction. It is worthwhile to note that in the conventional financial transaction system with credit/debit cards, the authorization stage is performed prior to the authentication and the accounting stages of the financial transaction.

Once the transaction authorization is sent to a party at the point of sale 206, the first accounting step 202 is performed. The account involved in the transaction is left with a locked sum of money to assure a payment to a party at the point of sale 207. The payment is made after deduction of the transaction fee to the card issuing bank and the discount rate fee to the acquiring bank or an independent sales organization, which provided merchant status to a party at the point of sale. Once step 207 is completed, the back office is ready for another transaction of the same account holder, provided the requested spending limit is not exceeded.

Then if the credit card is signed, the signatures on the selling draft and on the card are visually compared by a party at the point of sale for off line financial transactions 208. If the card is not signed, identification documents are requested from account holder 209. Steps 208 and 209 are components of the authentication stage of financial transaction 203 for the conventional off line financial transaction system. It can be noted here that the signature comparison step 208 is skipped by the conventional electronic commerce on line financial transaction system based on credit/debit card usage. Such electronic commerce systems enforce step 209, requiring wider disclosure, than in the case of an off line financial transaction, of personal information about the account holder. Then the final step of the accounting stage 204 is performed. Step 210 includes the following: a party at the point of sale sends the selling draft inside the selling batch after trade hours to the acquiring bank (or an independent sales organization). The acquiring bank re-routes the relevant part of the batch to the card issuing bank, which unlocks the payment and transfers it to a merchant account after deductions, specified in the merchant's agreement. Then in a few days, the money is placed into a merchant account.

The conventional financial transaction architecture based on credit or debit cards and shown in FIG. 2 has a number of weaknesses, which the present invention addresses, including the following:

1) The authentication stage is de-coupled from the back office CPU and dB, making it subjective, embarrassing, and error and fraud prone.

2) The authorization stage is de-coupled from account holder for both on and off line financial transactions, making it especially dangerous for on line financial transactions (for example, due to on line financial transaction latency, a number of unauthorized financial transactions may happen before the account holder regains control on the account).

3) Personal information leaks are possible on the Internet communication lines during electronic commerce sessions (browsing technology, TCP/IP protocols, PKI, SSL and other Internet technologies do not guarantee sufficient financial transaction security).

4) The accounting stage is de-coupled from the account holder, potentially causing inconvenience during a series of buy and sell financial transactions.

5) A party at the point of sale may collect and analyze personal information about the account holder, and market and sell the information for profit. This leaves the public at large unaware of the privacy and confidentiality status of the data.

Present on line and off line financial transaction architectures have substantial security and privacy deficiencies at the authentication, authorization and accounting stages. It would be highly desirable to provide an improved system and method wherein consumers can perform financial transactions with financial institutions without privacy and security concerns. The present invention addresses these problems.

SUMMARY OF THE INVENTION

It is therefore an object of the present invention to cut off access by merchants, sellers and vendors to personal information about consumers during financial transactions.

A further object of the present invention is to allow an account holder to cut off access by bank tellers to private personal files of account holders during withdraw and deposit transactions.

A further object of the present invention is to provide a method, which couples together an account holder and a back office during the authentication stage of a financial transaction to enhance security of financial transactions.

A further object of the present invention is to create an authentication stage architecture for financial transactions, which makes the authentication stage of a financial transaction transaction-specific; e.g. it can be used for only one particular financial transaction.

A further object of the present invention is to include the beginning of the accounting session of a financial transaction in the authentication stage architecture of a financial transaction, to enhance the transaction specific authentication architecture.

A further object of the present invention is to architect a financial transaction authentication session in a way that makes a time specific, positive authentication for a particular financial transaction.

A further object of the present invention is to design a system and to provide a method for financial transactions that enables merchants, sellers, and vendors to request authorization and accounting from a financial institution back office for one particular financial transaction requested by an account holder.

A further object of the present invention is to include the end of the accounting session in the authorization stage architecture of a financial transaction.

A further object of the present invention is to create a financial transaction architecture that provides a high security level even in an environment with possible leaks on communication lines, such as may occur due to incomplete security in such Internet technologies as SSL (Secure Socket Layer), TCP/IP protocol, WEB browsers etc.

A further object of the present invention is to provide "clocked" AAA for financial institution back offices that allows implementation of financial transaction specific AAA architectures.

The present invention is a system and method for providing private and secure financial transactions. The system and method comprise a "clocked" AAA method embedded into back office privacy layer architectures. The architecture comprises "back office connection devices" for use by account holders to connect to financial institution back offices. Such devices include for example regular phones, and personal computers with a specific Graphical User Interface (GUI) invoked through a Universal Resource Locator (URL) address. Alternatives include network computers or wireless personal organizers, interactive TV set sessions or smart cards with customized read/write devices to interact with financial institution back offices. The architecture comprises also a back office central processing unit ("the CPU"), which could include a farm (or cluster) of computers and file servers operated under for example UNIX Sun/Solaris or Windows NT operating systems; a number of software programs (software modules) designed to implement various functions of the "clocked" AAA; and a relational database (dB) inside financial institution back offices, where the actual account information is stored and accessed. The back office includes a dB connected to the CPU where information is processed using the "clocked" AAA program environment.

The present invention allows consumers having membership with any financial institution to perform financial transactions in a highly secure and private manner. Account holder personal information need not be disclosed to a party at the point of sale or to a bank teller. Finally, the system and method are well adapted to the current and upcoming software, hardware and electronic commerce technologies and can be easily implemented given an acceptable business trade off.

A method for managing financial transactions according to the present invention includes performing an authentication process, an authorization process and an accounting process. The authentication process is executed for a predicted transaction by a particular account holder. The predicted transaction has a predicted transaction amount and a predicted transaction time. The authentication process produces a transaction signature for presentation upon execution of the predicted transaction. The authorization process for a particular transaction has an actual transaction amount and an actual transaction time which are determined upon presentation of the transaction signature. The authorization process includes verifying that the presented transaction signature matches the transaction signature for the predicted transaction, that the actual transaction amount matches the predicted transaction amount, and that the actual transaction time matches the predicted transaction time. The accounting process for the particular transaction is performed as a result of a successful authorization process. The accounting process includes reconciling the predicted transaction amount and actual transaction amount for the particular account holder.

According to one embodiment of the invention, the predicted transaction amount and the transaction signature for a predicted transaction are stored in an authentication record in a database at the financial institution back office. Likewise, an authorization record is created during the authorization process. The authorization record and the authentication record are compared to complete the authorization process for the transaction. Thus, the authentication record includes the predicted transaction amount and the transaction signature. Also, a predicted transaction time is stored in the database which holds the authentication record, as for example, a time out interval length used in combination with a time of creation of the authentication record, or for another example, as an absolute time value.

One representative embodiment of the authentication process includes establishing a communication session between the particular account holder and the financial transaction server, accepting an account number as input, prompting the particular account holder to supply a static identification number at a first instance, and a dynamically identified combination of digits from personal identification code, wherein the combination does not include all of the personal identification code, at a second instance. Further, the predicted transaction amount is accepted as input. The transaction signature is produced and sent to the particular account holder. The information identifying the predicted transaction, and the time stamp are stored in an authentication record.

A representative embodiment of the authorization process includes establishing a communication session between a party to the particular transaction and a financial transaction server. At the server, a presented transaction signature is accepted and an actual transaction amount is received as inputs. The server compares the time of the particular transaction with the predicted time, and the presented transaction signature and the actual transaction amount with the predicted transaction amount and the transaction signature associated with the transaction. An authorization message is sent to the party to the transaction upon successful matching of the parameters.

The process for managing financial transactions according to present invention works with or without identification of the account holder during the authorization process.

In various embodiments, the present invention comprises a system which executes the authentication process, the authorization process, and the accounting process utilizing communication media interconnecting the back office with individual end stations, such as cell phones, point-of-sale devices, personal computers, handheld computers, and the like. In an alternative embodiment, the present invention comprises an article of manufacture storing computer programs used for executing the processes as outlined above.

In yet another embodiment, the present invention provides a financial transaction server including communication resources, processing resources, and data storage resources utilized for managing the processes described above.

The present invention also provides a method for automated authentication, authorization and accounting for financial transactions. The method comprises establishing an authentication record for a predicted transaction by a particular account holder. The authentication record includes information identifying a predicted transaction having a predicted transaction amount and a transaction time parameter. Also, an authenticated transaction signature for presentation upon execution of the predicted transaction is included in the authentication record. The method also comprises establishing an authorization record for a particular transaction indicating an actual transaction amount, an actual transaction time and a presented transaction signature. The authorization record and the authentication record are matched to determine whether the presented transaction signature matches the authenticated transaction signature for the predicted transaction, whether the actual transaction amount matches the predicted transaction amount, and whether the actual transaction time matches the transaction time parameter. Finally, the predicted transaction amount and actual transaction amount are reconciled for the particular account holder. According to various embodiments, the method includes storing the authentication record in a database including a plurality of authentication records for predicted transactions. The process involves periodically attempting to match authentication records with authorization records being created with a timed algorithm, which automatically times out authentication records based on their time of creation and a parameter determining a length of time within which the predicted transaction must be completed.

In sum, a secure and private financial transaction process is provided that can be deployed efficiently and which addresses many of the deficiencies of other existing systems.

Other aspects and advantages of the present invention can be seen on review of the drawings, the detailed description and the claims which follow.

BRIEF DESCRIPTION OF THE DRAWINGS

FIG. 8 is the EPSL transaction checklist.

DESCRIPTION OF PREFERRED EMBODIMENTS

Figure 1A:
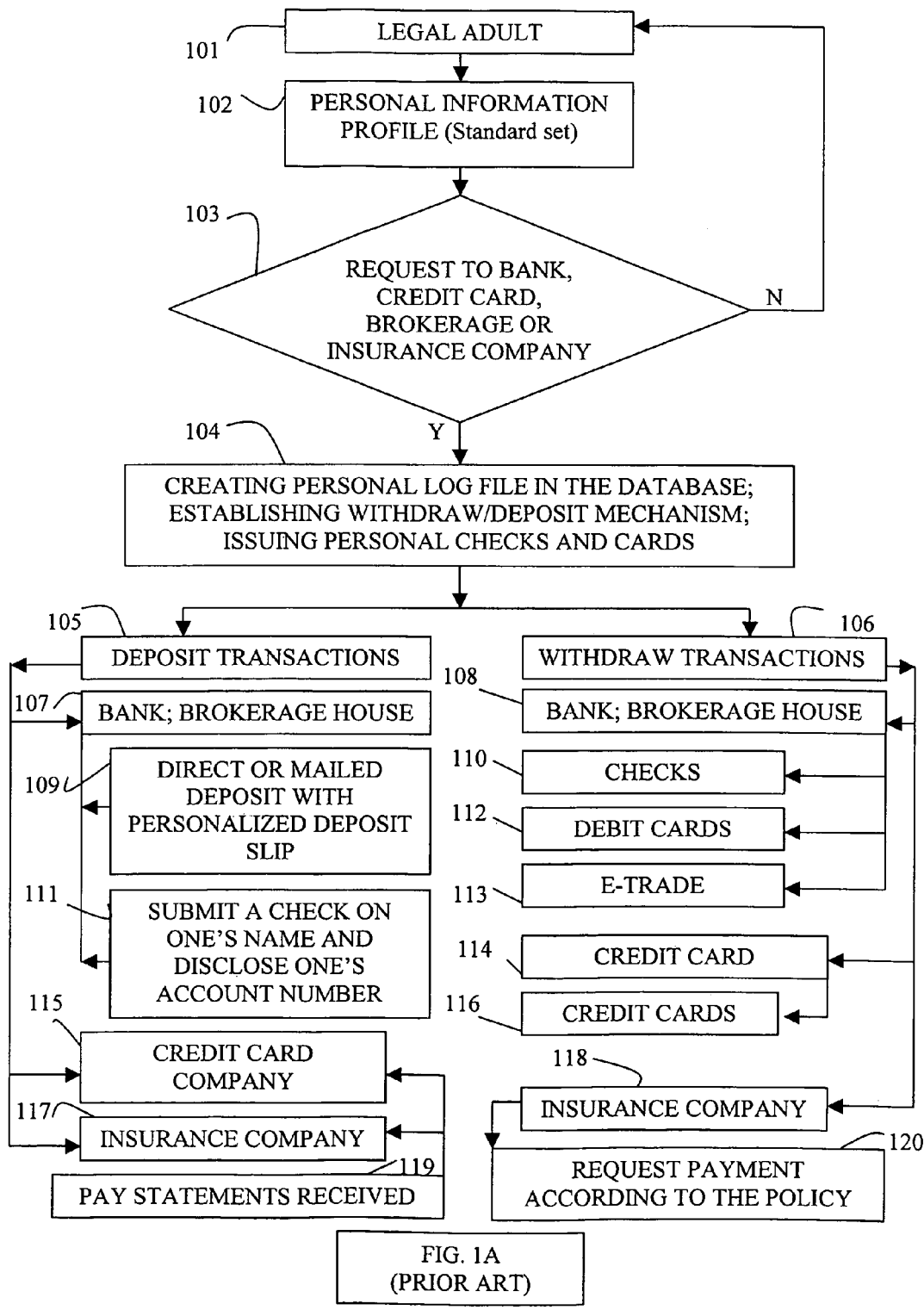
FIG. 1A is a block diagram of a conventional system for performing withdraw/deposit transactions.
Figure 1B:
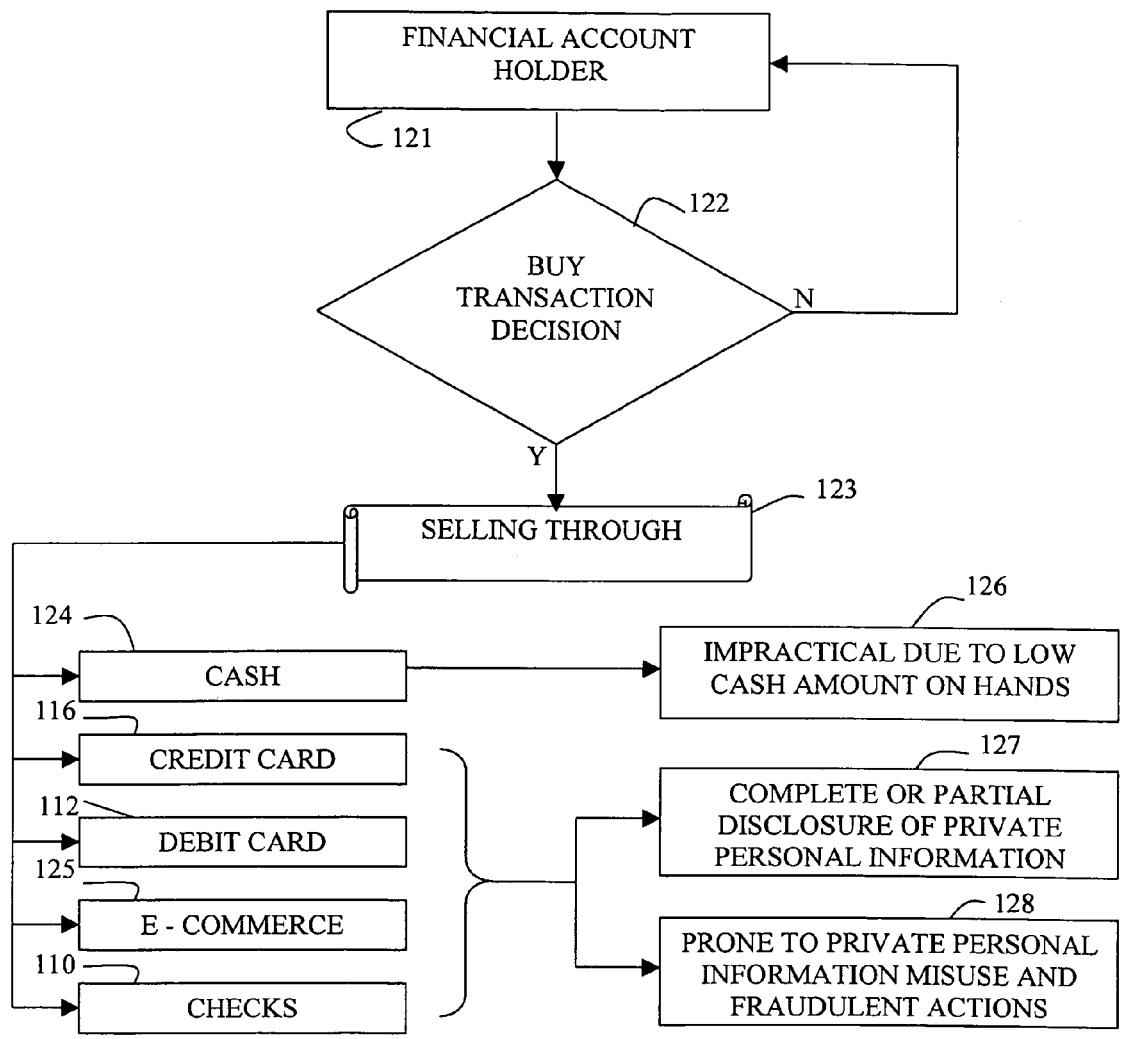
FIG. 1B is a block diagram of a conventional system for performing buy/sell transactions.
Figure 2:
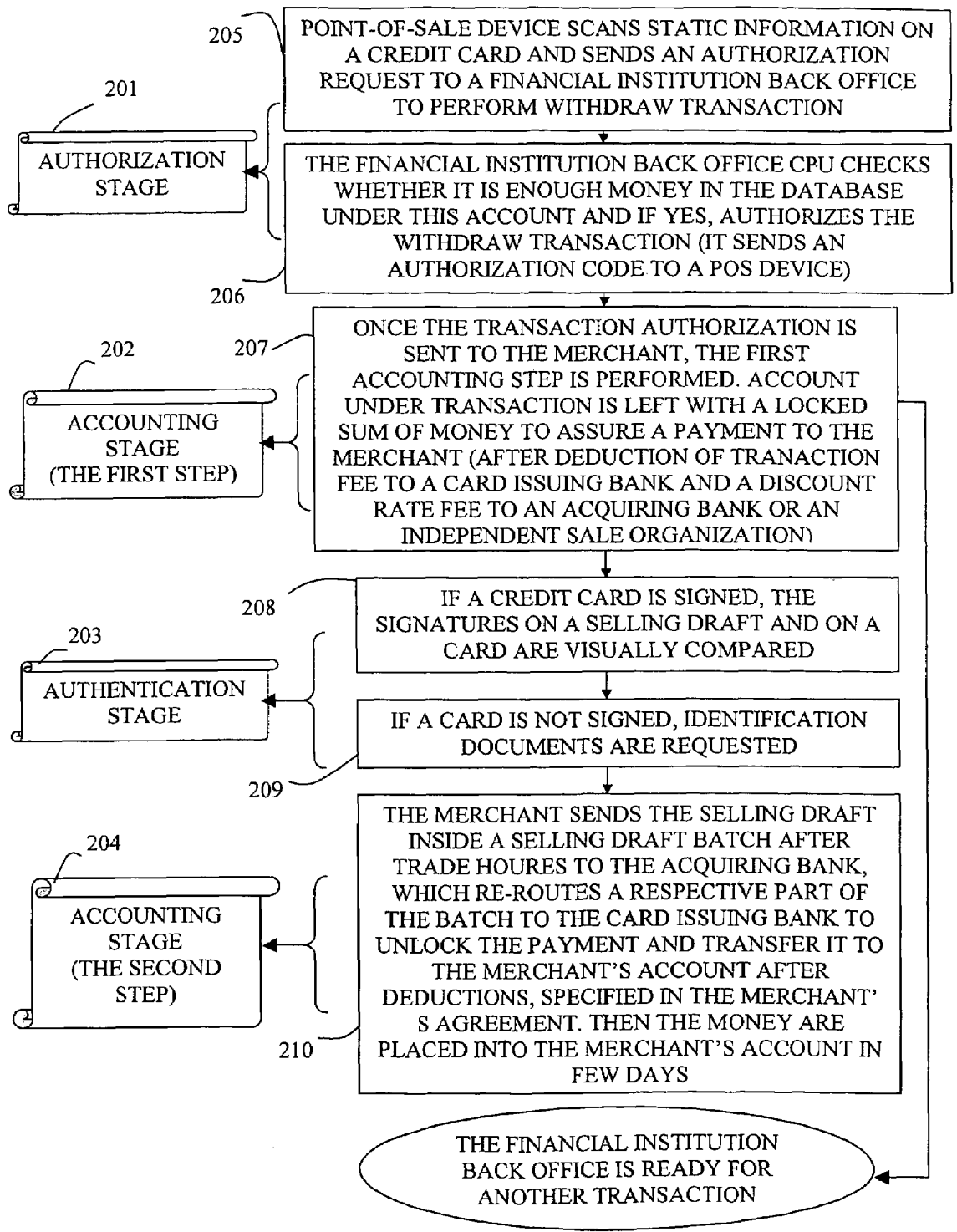
FIG. 2 is a block diagram of a conventional system and method for performing authentication, authorization and accounting sessions during buy/sell transactions with a credit card or a debit card.
Figure 3:
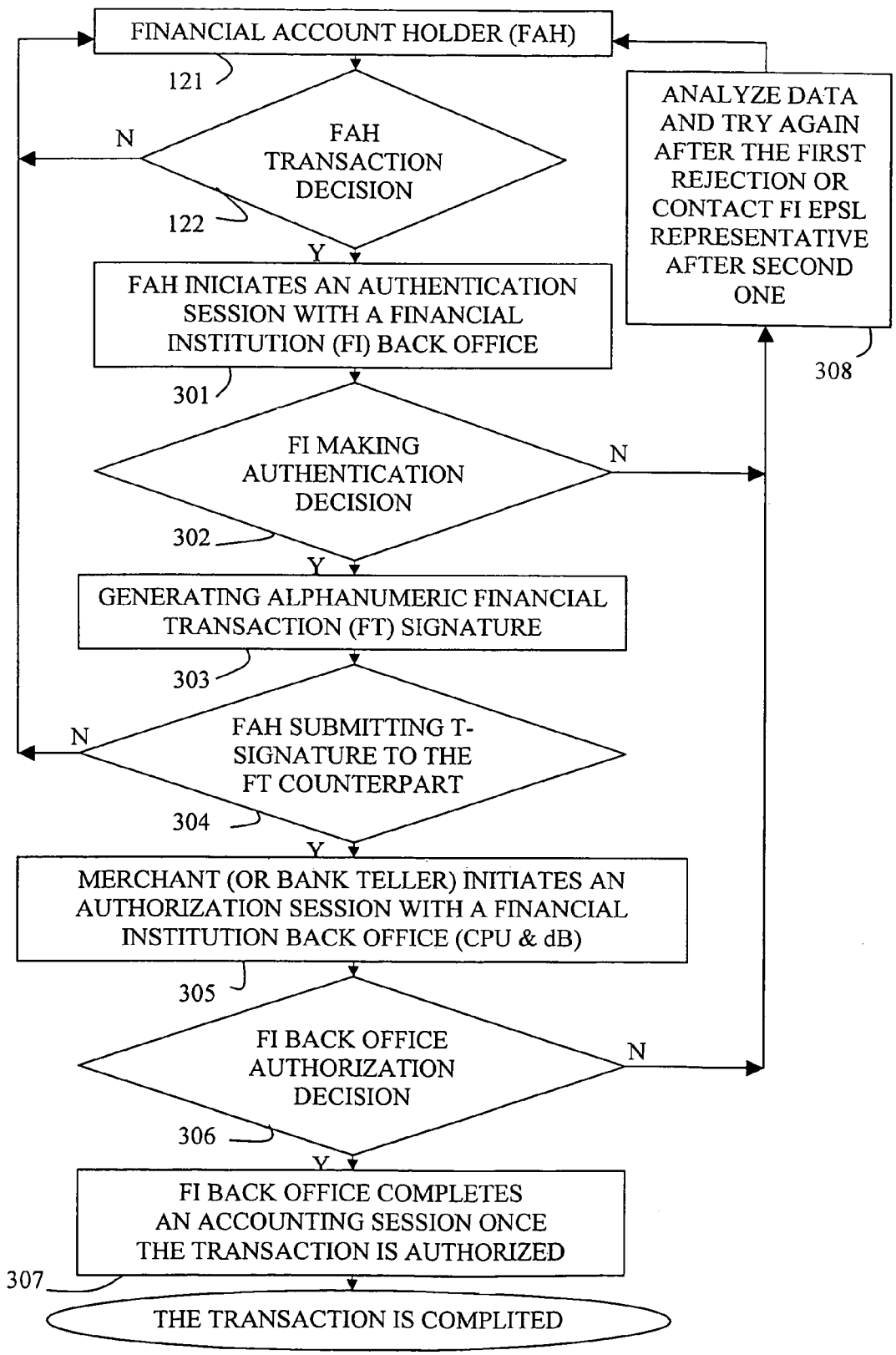
FIG. 3 is a flow diagram of the embedded privacy and security layer EPSL architecture for either buy/sell or withdraw/deposit transactions.

FIG. 3 shows a flow diagram of an embedded privacy and security layer EPSL architecture for financial transactions according to the present invention. Account holder 121 makes a transaction decision 122 independent of the location and manner in which it will be carried out, such as whether it will be an on-line or off-line transaction and such as the location of a specific point of sale or bank teller. It is assumed at this stage that the account holder knows an approximate or exact amount of money, which will be required to perform the predicted financial transaction. Following the transaction decision (step 122), at step 301, the account holder initiates an authentication session with a back office server in which the account holder's account resides. More details of how the authentication session is performed at a back office according to the present invention are described later. However, several features of step 301 are disclosed here.

The account holder has to go through three tiers of security protection, to initiate the authentication session. The first two tiers include disclosing a financial institution account number and then a transaction static PIN secret number, which are intended to be known only to the account holder and financial institution back office. In embodiments described herein, the account holder has a first static PIN for a withdraw transaction, and a second static PIN for a deposit transaction. Since the back office may be accessed by an account holder through various dedicated communication lines, which do not have guaranteed security, a third tier of security protection is included. The third tier is based on an interactive dialog between the back office and the account holder. The back office prompts the account holder to enter a random subset of digits, particular to the given communication session, of an identity PIN secret number, which is known only to the account holder and financial institution back office. The third tier of security protection eliminates potential information leaks at the entry devices and on the communication lines used for the transaction. Whoever intercepts the random digit combination, requested during the third tier processing from the account holder, will not be able to either reuse it or reengineer the entire identity PIN.

According to another feature of step 301, the back office prompts the account holder to enter the predicted transaction amount of money. Then, at the end of the authentication session 302, an alphanumeric transaction signature is generated at the back office 303 and transferred back to the account holder. This signature is specific to a particular financial transaction amount requested by the account holder, and has a limited life time, set by default to a reasonable time interval sufficient enough to perform the financial transaction. It should also be noted here that the alphanumeric signature can be used for only one financial transaction and can not be reused.

Once the account holder is authenticated for a particular financial transaction, the account holder may still change his/her mind and back off from the financial transaction. To execute the transaction, the account holder submits the alphanumeric transaction signature to a party at the point of sale (such as a merchant or a bank teller) along with the account number. Neither the alphanumeric transaction signature nor the account number contain any personal information, which could be associated with the account holder by a party at the point of sale. At step 305 a party at the point of sale initiates an authorization session with the back office server. In addition to the alphanumeric transaction signature and the account number given by the account holder, the party at the point of sale provides a business ID and an actual transaction amount of money and then sends this information sequence along with a time stamp to the financial institution for authorization. More details about the system and method to perform an authorization session at the back office will be discussed later. Information sent by the party at the point of sale (or by a bank teller) for authorization is sufficient for both an authorization session decision making process 306, and for completion of the accounting session 307. At this moment, the financial transaction is completed in a highly secure manner without disclosing personal information about the account holder to a party at the point of sale.

The basic financial transaction architecture disclosed above is applicable to on-line and off-line financial transactions. Though hardware and software environments at the point of sale locations (like POS devices, GUI, selection of communication lines etc.) may vary for each of those two cases, the fundamental architecture of private and secure financial transactions remains the same. The authentication stage, becomes the first performed step in the system and has paramount priority and security enforcement. The authentication process does not involve a party at the point of sale, to authenticate the account holder. Rather, authentication is performed by the financial institution back office. This authentication process prevents fraud, embarrassment and misuse of personal information by a party at the point of sale (or by a bank teller). The account holder can not repudiate the financial transaction, as nobody else could transact it in his or her place. The authorization and accounting stages of the financial transaction in the revealed system architecture cannot occur without a prior request by the account holder. Thus, authorization and accounting are coupled with the actual account holder, while authentication sessions are tightly coupled with the financial institution back office.

Figure 4:
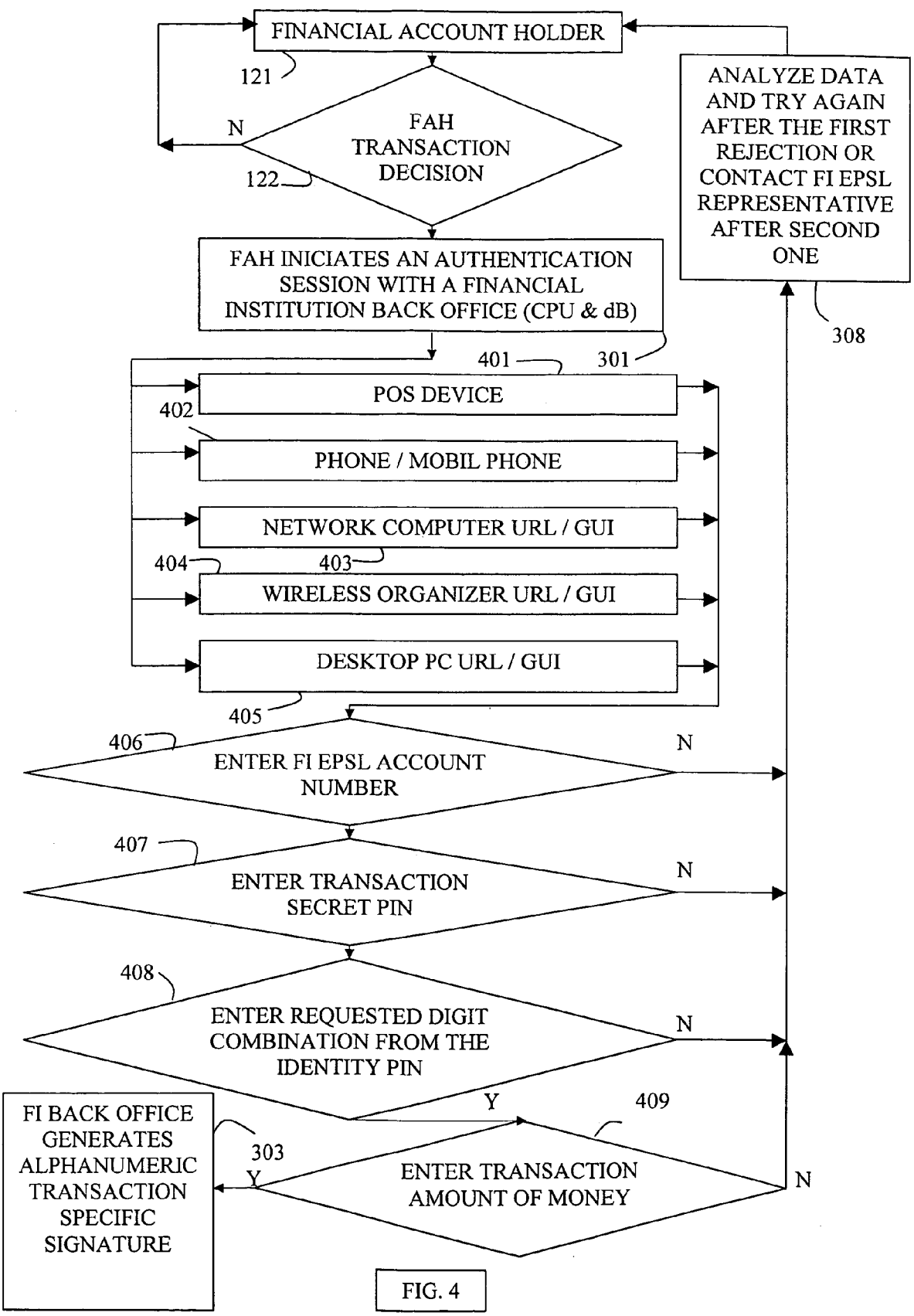
FIG. 4 is a flow diagram of the EPSL authentication session (while on account holder side).

FIG. 4 illustrates a flow diagram of the authentication session (from the account holder side). Basically, FIG. 4 is a more detailed flow diagram of steps 121-122-301-302-303 shown earlier in FIG. 3, which all together constitute the authentication session for the account holder with the financial institution back office. The account holder may use various devices and communication lines to reach the financial institution back office. As illustrated in FIG. 4, example communication devices include point of sale POS devices 401, conventional phone lines and mobile phones 402, network computers 403 or wireless organizers 404 with URL/GUI capabilities and desktop personal computers connected to the Internet (or specialized financial institution on-line services) 405. Once a connection to the back office is established, the account holder is first requested to enter an account number 406 (the first security tier) for the ESPL account. Then the account holder is requested to enter a transaction type specific, static PIN secret number 407 (the second security tier) and a requested random combination of digits from an identity PIN secret number 408 (the third security tier). Finally, the account holder enters an expected transaction amount of money 409. A failure in making any of steps 406-407-408-409 leads to refusal by the back office to perform the authentication session. It is expected that the account holder at this point will try again to initiate an authentication session, or after a second rejection contact the financial institution EPSL representative 308. Upon successful completion of these steps, the back office server delivers an alphanumeric transaction specific signature generated at the back office to the account holder 303. Step 409 is a last step in the authentication session, and it begins the accounting session at the financial institution back office. In this step 409, the predicted amount of money requested by the account holder is compared with an amount available in the account. The predicted amount should not be less than the actual amount specified later by a party at the point of sale (or by a bank teller). It is important to note that step 303 will not be reached and the authentication stage at step 409 will be rejected, if the card or account number associated with the account is listed at the back office as lost, stolen or fraudulently used. The authentication stage at step 409 will also be rejected, if the transaction amount of money requested by the account holder exceeds the available funds at the financial institution for the account.

Figure 5:
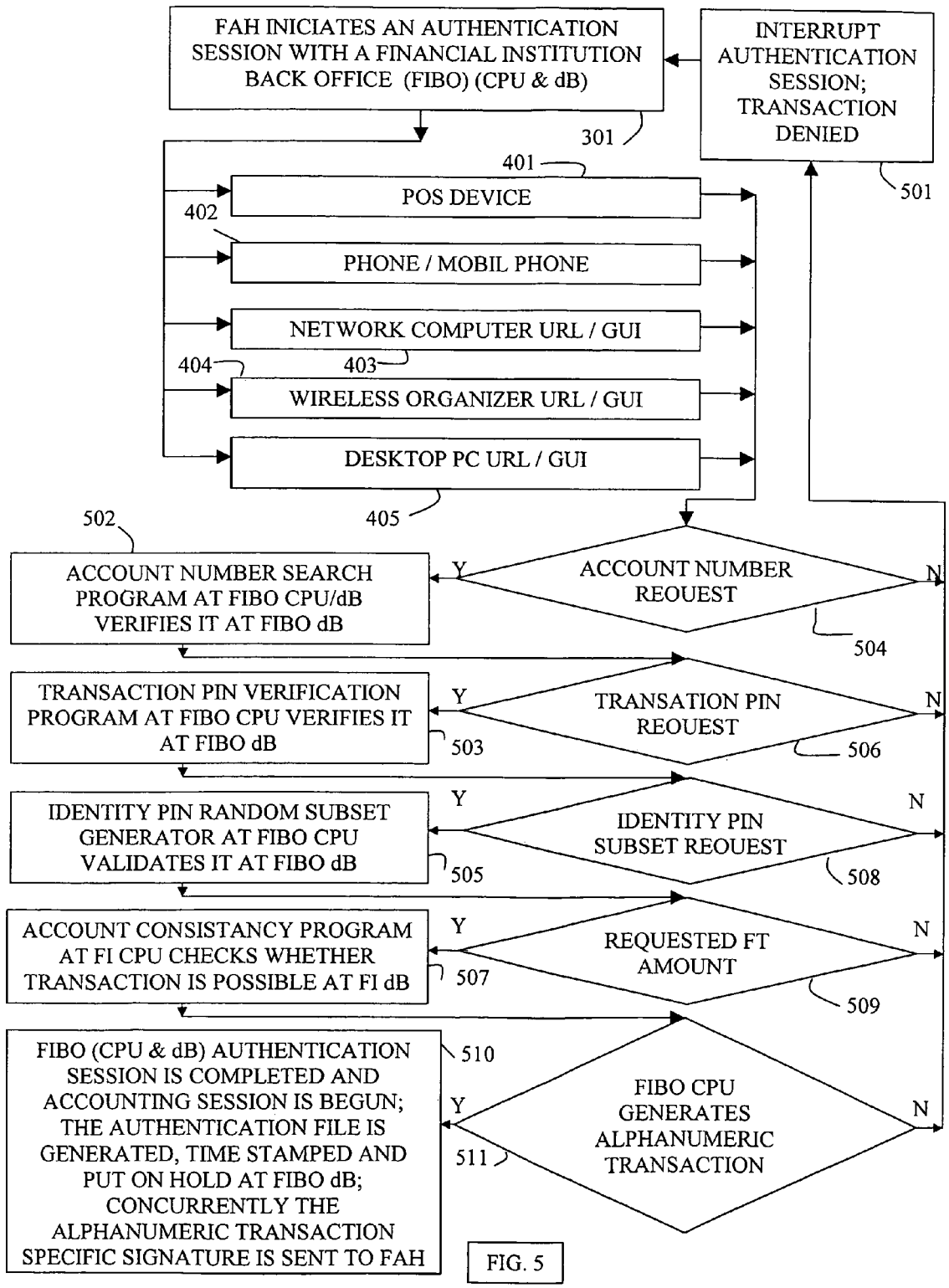
FIG. 5 is a flow diagram of the EPSL authentication session (while on back office CPU and dB side).

FIG. 5 shows a flow diagram of the EPSL authentication session (from the back office server side, where the server includes a CPU and a dB). The authentication session in the disclosed financial transaction system architecture is central to its operation. Thus it is necessary to show how the back office system is adapted to handle the authentication session. An account holder initiates the authentication session with the back office 301 in the same way and through the same communication devices/channels as shown in FIG. 4. Although a detailed system and method of performing AAA at the back office will be described later, certain features specific to the authentication session features are discussed here.

The back office server in this embodiment includes a computer program including an ACCOUNT NUMBER SEARCH PROGRAM module 502, a TRANSACTION PIN VERIFICATION PROGRAM module 503, an IDENTITY PIN RANDOM SUBSET GENERATOR module 505, and an ACCOUNT CONSISTENCY PROGRAM module 507.

At decision-making step 504, the ACCOUNT NUMBER SEARCH PROGRAM module 502 is activated in the back office server, which transitions the authentication session to the next decision-making step 506, provided account number verification is successful. At step 506 TRANSACTION PIN VERIFICATION PROGRAM module 503 is activated and transitions the authentication session to decision-making step 508, provided transaction type PIN verification in the back office dB is successful. At step 508 IDENTITY PIN RANDOM SUBSET GENERATOR module 505 is activated at the back office CPU and transitions the authentication session to decision-making step 509, provided a random subset of digits is validated at the back office dB. At step 509 ACCOUNT CONSISTENCY PROGRAM module 507 is activated at the back office CPU and transitions the authentication session to decision-making step 511, provided the predicted transaction amount of money, specified by the account holder during an authentication session does not exceed available funds in the account. At step 511 the authentication session is completed at the back office and the accounting session is begun 510, unless the account is flagged because for example the account number is in the list of lost, stolen or fraudulently used accounts, which would lead to rejecting the entire authentication session. Otherwise, the authentication file will be generated, time stamped and put on hold at the back office dB concurrently with the alphanumeric financial transaction specific signature, which is generated and sent to the account holder. One may note that a number of program modules 502, 503, 507 and 510 are incorporated into the back office software environment to perform an authentication session. This is just a part of the automated "clocked" AAA sessions, which constitute the system and method at the back office to enable EPSL technology for a financial institution.

Figure 6:
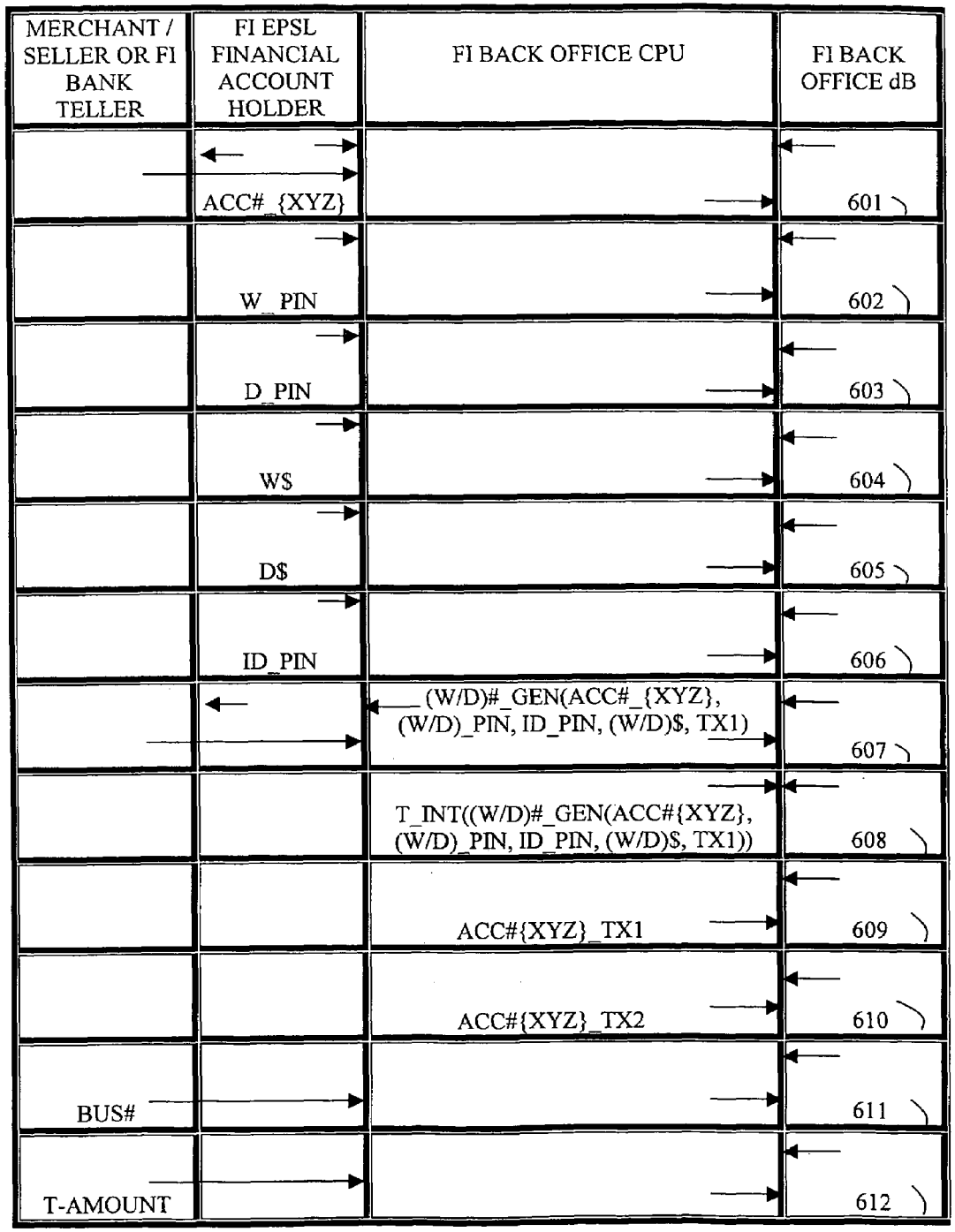
FIG. 6 is an interface protocol of the EPSL architecture.

FIG. 6 shows an interface protocol of the EPSL architecture. The columns correspond to processing nodes that process parameters. The rows 601-612 correspond to parameters involved in the procedures. A parameter name in a cell shows where the parameter is originated. If an arrow onset occurs in a cell where a parameter is originated, an arrowhead shows where the parameter is delivered for further processing. If an arrow onset occurs in a cell location different than the cell location in the same row at which the parameter originates, this arrow shows a destination cell to which a parameter was moved for processing in an earlier exchange, and from which it is moved again as indicated by the arrow.

Parameter ACC#_{XYZ} 601 is the account number for the financial institution EPSL account. "XYZ" should be broadly constructed to mean a certain number, which uniquely characterizes an account holder. Parameter W_PIN 602 is a withdraw transaction PIN secret number. Parameter D_PIN 603 is a deposit transaction PIN secret number. Parameter W$ 604 is a withdrawal transaction amount, specified by the account holder during an authentication session. Parameter D$ 605 is a deposit transaction amount, specified by the account holder during an authentication session. Parameter ID_PIN 606 is the identity PIN secret number, used by the back office and account holder during an interactive part of an authentication session. Parameter (W/D)#_GEN(ACC#_{XYZ}, (W/D)_PIN,ID_PIN,(W/D)$,TX1) 607 is an alphanumeric signature, generated at the end of a successful authentication session. (W/D)#_GEN is a function of other parameters, listed within the parenthesis above. The only parameter still unknown is TX1, which is a time point at which an authentication session is successfully completed (see FIG. 9). Parameter T_INT ((W/D)#_GEN(ACC# {XYZ},(W/D)_PIN,ID_PIN,(W/D)$,TX1)) 608 is a time interval, counted from the moment TX1. It specifies an alphanumeric signature lifetime for a specific financial transaction derived internally at the back office server at time end of a successful authentication session. Parameter ACC#_{XYZ}_TX1 609 is an authentication file name, defined at the end of a successful authentication session inside the financial institution back office. Parameter ACC#_{XYZ}_TX2 610 is an authorization file name, defined inside the financial institution back office server at the beginning of a successful data transfer at the beginning of an authorization session. Parameter BUS# 611 is a merchant/seller/vendor standard ID number specified by a party at the point of sale during an authorization session request. Parameter T-AMOUNT 612 is an exact amount of money, required to perform the financial transaction and specified by a party at the point of sale (or by a bank teller) during an authorization session request.

Figure 7:
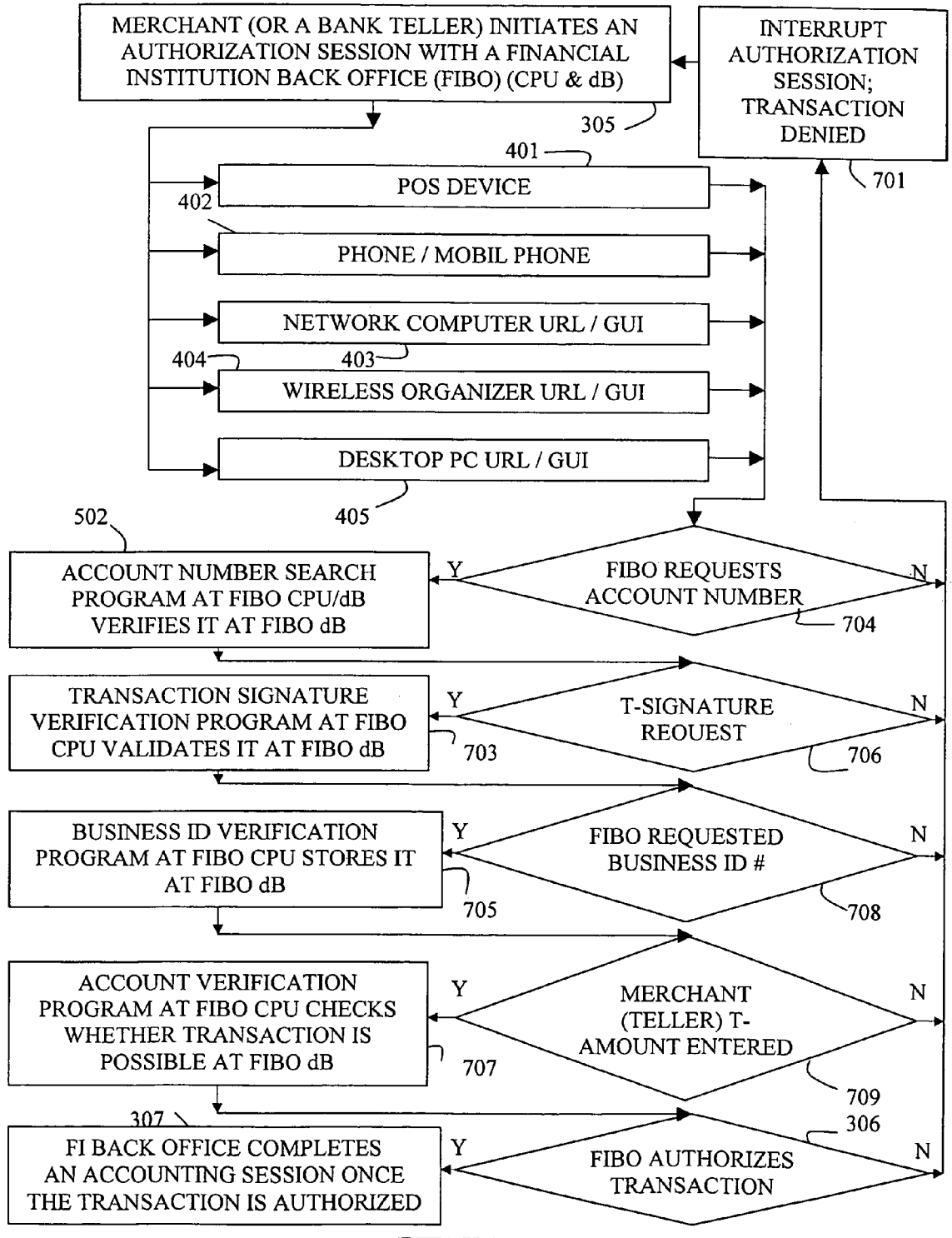
FIG. 7 is a flow diagram of the EPSL authorization session.

FIG. 7 shows a flow diagram of the EPSL authorization session. It corresponds to steps 305-306-307 in FIG. 3. All together they constitute the authorization session of a financial transaction. A party at the point of sale can access the back office to initiate the authorization session using the same devices/communication lines 401-405 as an account holder, when initiating the authentication session (see FIGS. 4-5). Though a detailed system and method of performing AAA at the back office will be described later, certain features specific to the authorization session can be described here. The back office server utilizes the modules identified above and additional modules for the authorization session, including a TRANSACTION SIGNATURE VERIFICATION PROGRAM module 703, a BUSINESS ID VERIFICATION PROGRAM module 705, and an ACCOUNT VERIFICATION PROGRAM module 707.

At decision-making step 704, ACCOUNT NUMBER SEARCH PROGRAM module 502 is activated at the back office server and transitions the authorization session to decision-making step 706, provided the account number is positively verified at the back office dB. Otherwise, the authorization session is denied. At decision-making step 706, TRANSACTION SIGNATURE VERIFICATION PROGRAM module 703 is activated at the back office CPU and transitions the authorization session to decision-making step 708, provided the alphanumeric transaction signature is validated at the hack office dB. At decision-making step 708, BUSINESS ID VERIFICATION PROGRAM module 705 is activated at the back office CPU and transitions the authorization session to decision-making step 709, provided a party at the point of sale ID is on a list of valid, legal merchants. At decision-making step 709, ACCOUNT VERIFICATION PROGRAM module 707 is activated at the back office CPU and transitions the authorization session to decision-making step 306, provided the predicted transaction amount entered by the account holder at the corresponding authentication session is more than or equal to the actual amount entered by a party at the point of sale during the authorization session. At decision-making step 306, the back office completes authorization and accounting sessions, provided the account is not on a list of lost, stolen or fraudulently used accounts. This checks again whether there are no suspicious issues related to this particular account since the authentication session was completed.

It can be noted here that a number of program modules 502, 703, 705, 707 and 307 are incorporated into the back office software environment to perform an authorization session. As will be seen later, this is part of the automated "clocked" AAA sessions, which constitute the system and method implemented at the back office to enable financial institution EPSL technology.

FIG. 8 shows the EPSL transaction checklist. Pluses mean that a particular parameter in a respective row is used during one of the AAA sessions, specified at the top of the columns. Minuses mean that parameters are not used. The columns correspond to the authentication, authorization and accounting sessions.

Figure 9A:
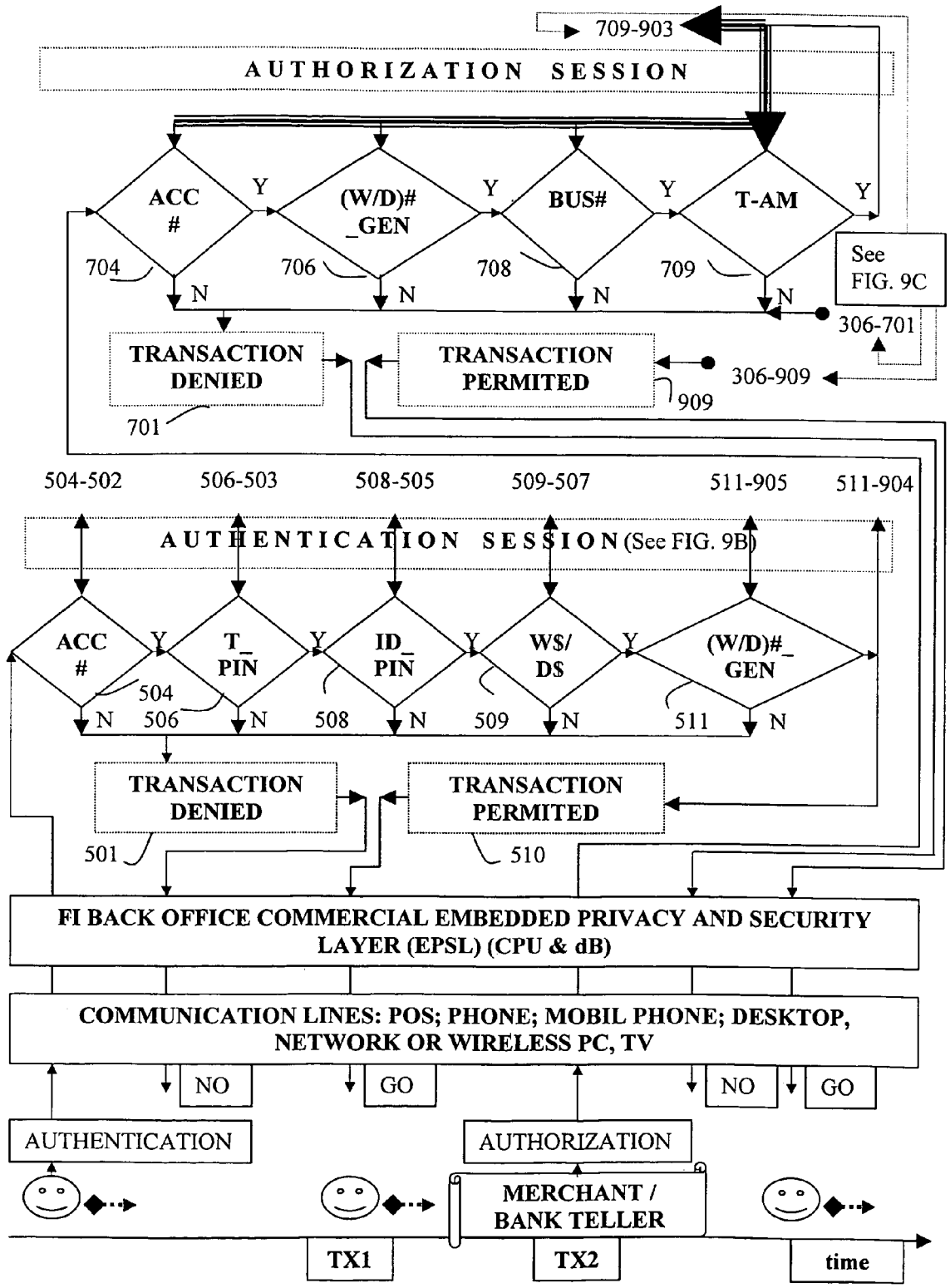
FIGS. 9A, 9B and 9C are a synthesis of a timing diagram, a flow chart and a functional diagram of the EPSL architecture based on the "clocked" AAA technology.
Figure 9B:
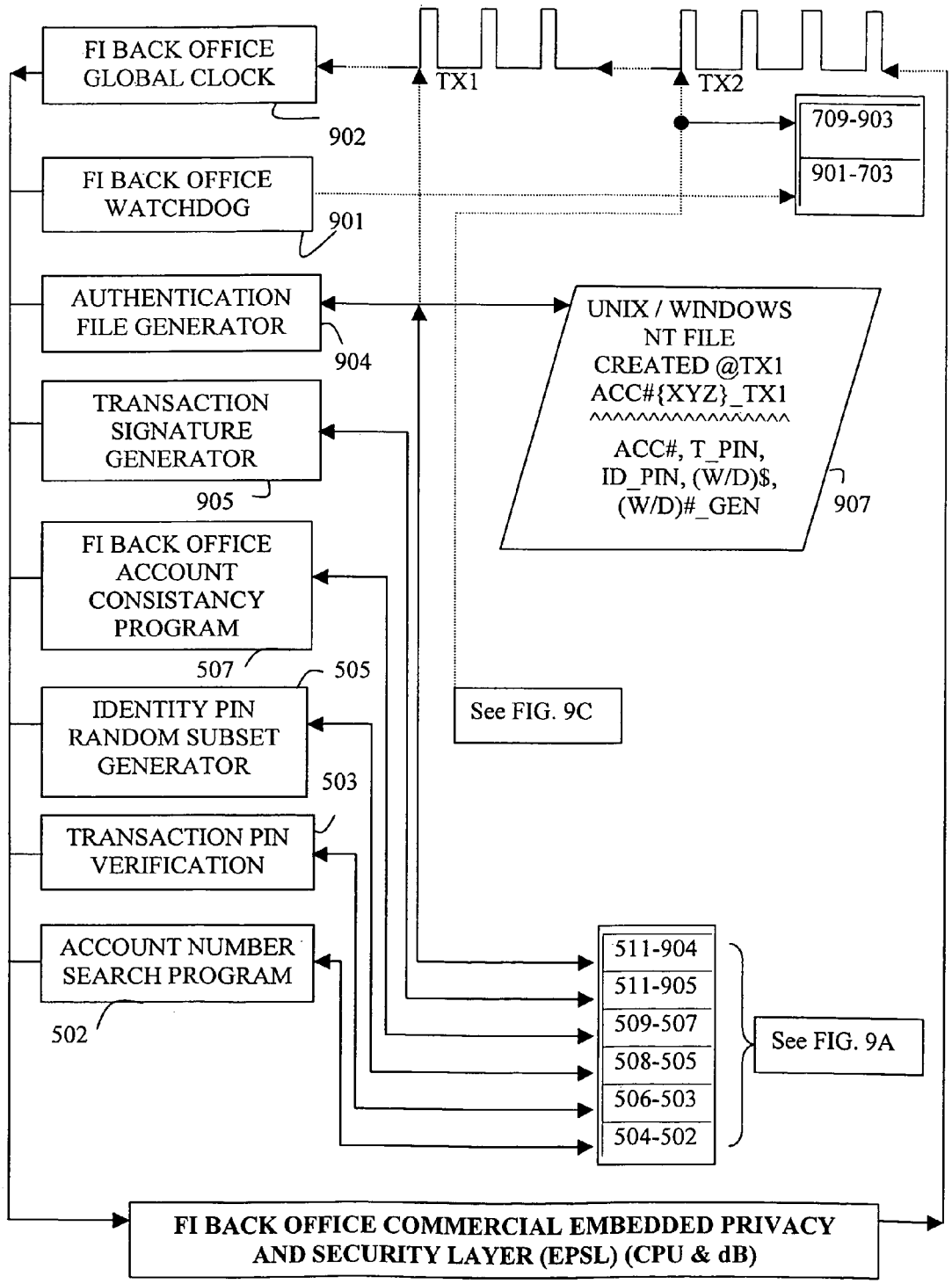
Figure 9C:
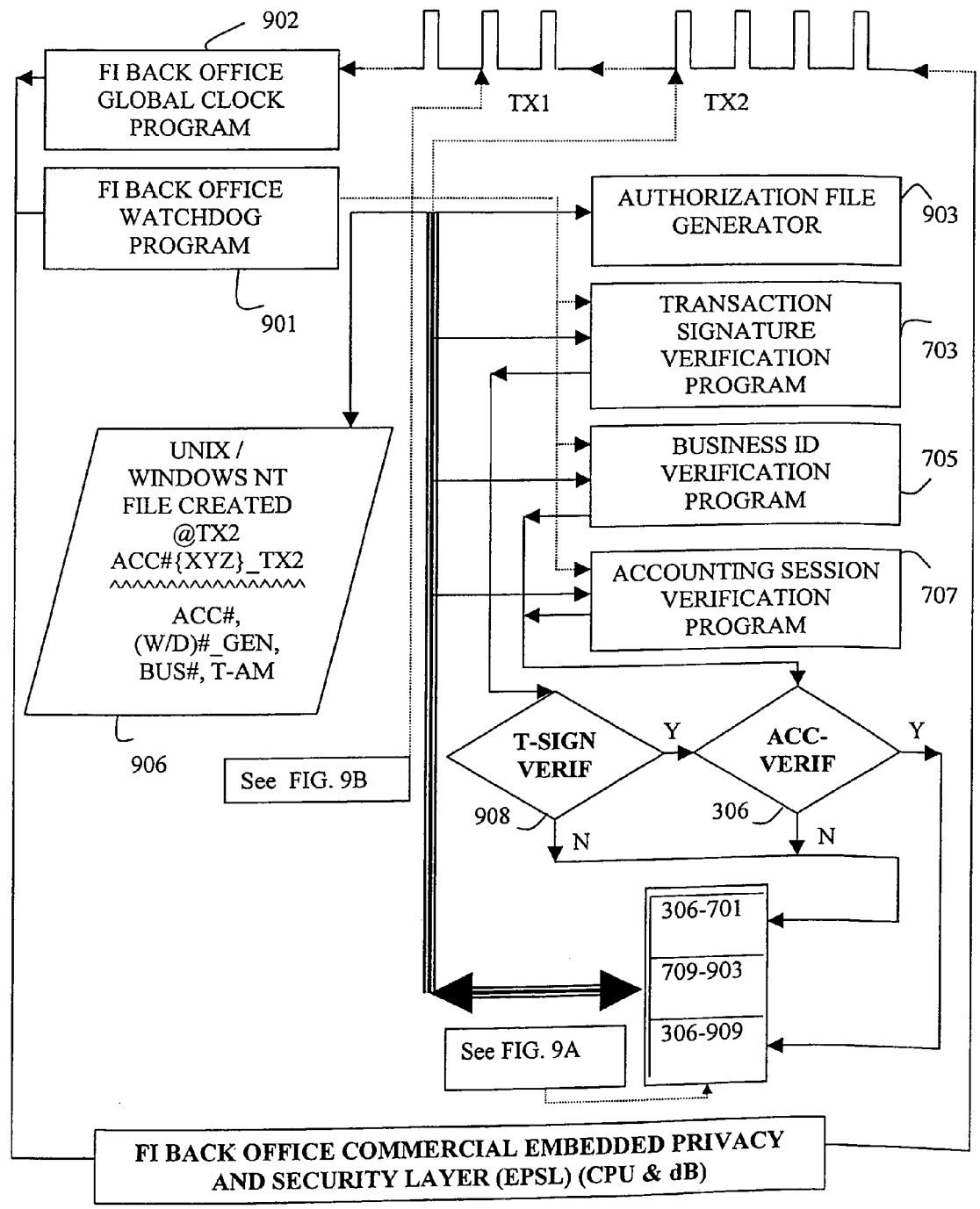

FIGS. 9A, 9B and 9C illustrate a computer implemented synthesis of a timing diagram, a flow chart and a functional diagram of the EPSL architecture based on the "clocked" AAA technology. One may note that the part, related to the AUTHENTICATION SESSION (a dotted line of a non-numbered cell), is already presented in FIGS. 4-5, while the part named the AUTHORIZATION SESSION (also a dotted line of a non-numbered cell) is described in FIG. 7.

The hack office has GLOBAL CLOCK PROGRAM module 902. A hardware equivalent is implemented as a silicon digital integrated circuit internal clock (with a typical rate approximately within the range (10-1,000) MHz). Module 902, which can be fed by similar clock at the back office CPU, synchronizes all program modules during AAA sessions. Each financial transaction beginning from the start of the authentication session and up to the end of the authorization and accounting sessions is processed depending on its time position, defined by the global clock. The global clock synchronizes all program modules. Every program module is activated by one of the other program modules once its job is completed Key information elements of financial transactions stored in the back office dB (for instance, authentication and authorization files) are strictly analyzed and differentiated depending on their positions in time, which is a part of a decision making process at the financial institution back office. The global clock program module enables identification of the financial transaction related timing components and parameters, as well as the entire EPSL system of program modules and hardware synchronization at the financial institution back office.

An account holder initiates the authentication session with the back office through any of the devices/communication lines described above by entering a series of numbers (three tier security protection system described above). Once the beginning of a communication session is established, module ACCOUNT NUMBER SEARCH PROGRAM 502 is activated, requesting the account holder to enter an account number. Once the account holder has entered ACC#_{XYZ}_601, if ACC#_{XYZ} is positively verified, module 502 activates module TRANSACTION PIN VERIFICATION PROGRAM 503 and stops its own execution. If ACC#_{XYZ} is not verified at the back office dB, the financial transaction authentication session is denied and module 502 stops execution without activating module 503. Decision-making routine ACC#504 is a part of module 502 and makes a decision whether to activate module 503 or not, based on ACC#_{XYZ} verification results at the back office dB.

TRANSACTION PIN VERIFICATION PROGRAM module 503, once activated, requests the account holder to enter a transaction PIN and executes, once the W_PIN 602 or D_PIN 603 is entered. Decision-making routine T_PIN 506, which is a part of module 503, stops module 503 and activates IDENTITY PIN RANDOM SUBSET GENERATOR module 505, provided (W/D) PIN is positively verified at the back office dB. Otherwise, routine T_PIN 506 stops module 505 and the authentication session is denied.

Module 505 once activated, generates a request to the account holder to submit in sequence a certain random combination of digits that constitute a subset of an account holder identity PIN secret number ID_PIN 606 and then analyzes a received reply, entered by the account holder during this interactive session (the third tier of back office security protection). Decision-making routine ID_PIN 508, which is a part of module 505, stops module 505 and activates back office ACCOUNT CONSISTENCY PROGRAM module 507, provided the random subset of digits, entered by the account holder per the request of module 505 is positively validated at the back office dB. Otherwise, routine ID PIN 508 stops module 505 execution without activating module 507 and the authentication session is denied.

A back office ACCOUNT CONSISTENCY PROGRAM module 507, once activated, requests the account holder to enter a predicted withdraw transaction amount W$604 or predicted deposit transaction amount D$605 and executes, once the (W/D)$ is entered. Decision-making routine 509, which is a part of module 507, stops module 507 and activates TRANSACTION SIGNATURE GENERATOR module 905, provided W$ does not exceed the amount of money available on this account. Otherwise, routine (W/D)$509 stops module 507 execution without activating module 905 and the authentication session is denied.

TRANSACTION SIGNATURE GENERATOR module 905, once activated, generates an alphanumeric signature, provided all previous steps 504, 506, 508 and 509 are successful. Decision-making routine (W/D)#_GEN 511, which is a part of module 905, stops module 905 and activates module 904, provided the account is not on a list of lost, stolen or fraudulently used accounts. Concurrently with activating module 904, routine 511 sends the alphanumeric transaction signature to the account holder 510.

AUTHENTIFICATION FILE GENERATOR module 904, once activated, creates an electronic record, which contains some or all of the information gathered together during the authentication session: ACC#_{XYZ} 601, (W/D)_PIN 602 or 603, ID_PIN 606, (W/D)$604 or 605 and (W/D)#_GEN 607. The record is given a file name ACC#_{XYZ} TX1 609, which is a combination of the account number and a time mark TX1. TX1 is a time moment at which file ACC#_{XYZ}_TX1 907 is generated in the back office dB. Practically speaking, it is the same time as when the account holder obtains his alphanumeric signature for a requested financial transaction. The time mark TX1 is assigned at the end of the authentication session for the account holder and back office in this example. The authentication record with the file name ACC#_{XYZ} TX1 can be created irrespective to which operating system is deployed at the back office dB (for instance, UNIX/Solaris or Windows NT). Module 904 activates module 901 at the time moment TX1.

Back office WATCHDOG PROGRAM module 901, starting from the time moment TX1, searches the back office dB after each small time interval (which can range for example, from several milliseconds to several seconds, depending on the actual hardware/software implementation of the back office CPU and dB). The search checks whether there is another record with the same root name ACC#_{XYZ} and suffix TX2 greater than TX1 (TX2>TX1). Module 901 can work in this mode of operation during time interval T_INT 608, which starts at TX1 and is set at the back office to a reasonable time to perform a predicted financial transaction after the authentication session (for instance, a half an hour). Otherwise, it can be chosen by the account holder during the authentication session within a certain range (for example, from a quarter of an hour to several hours). The record with file name ACC#_{XYZ}_TX2 906, which back office WATCHDOG PROGRAM module 901 is searching for, is created during the authorization session, requested by a party at the point of sale from the financial institution back office. The authentication session completed at the moment TX1 is followed by the authorization session, which has an intermediate stage of creating an authorization record at the back office at some later time moment TX2 after TX1. The authorization file structure and its role in the "clocked" AAA technology will be discussed later along with the authorization session description.

The back office WATCHDOG PROGRAM module 901 stops searching for an authorization file 906 at the moment TX1+T_INT. Any authorization session, initiated by a party at the point of sale after that time will be denied with a message that the transaction signature is timed out. The account holder will need to initiate another authentication session for the same financial transaction to make it happen. Strictly speaking, module 901 will keep searching the back office dB after the moment TX1+T_INT with a gradually increased time interval between consecutive search sessions (for instance, a double interval for TX1+T_INT<t≦TX1+2*T_INT, a triple interval for TX1+2*T_NT<t<TX1+3*T_INT, etc.). However, its function is changed. When the authorization file is found, module 901 will forbid the financial transaction with the error message that the financial transaction is timed out. At certain time moment (for instance, TX1+10*T_INT) module 901 completely stops searching for the authorization file ACC#_{XYZ}_TX2 906. Any authorization session initiated by a party at the point of sale for the same financial transaction will be simply denied from now on.

The reason the search repetition time interval of module 901 is getting gradually increased after the moment TX1+T_INT is to reduce the load on the back office CPU. Limiting the lifetime of transaction signatures and making them specific to particular financial transactions allow eliminating any fraudulent actions based on decryption of these signatures. It greatly enhances security in using non-secure communication lines and line input/output devices. It is especially important for on line financial transactions and makes the EPSL technology a very suitable architecture for electronic commerce as well as for off-line financial transactions.

The account holder applies to a party at the point of sale (or a bank teller) after obtaining the alphanumeric transaction signature at the end of the authentication session. A party at the point of sale (merchant or a bank teller) initiates an authorization session with the back office using the same devices/communication lines as during the authentication session (see financial institution FIGS. 4-5). A party at the point of sale gets from the account holder, an account number and a financial transaction alphanumeric signature. Then the party at the point of sale adds up a standard business identification (merchant) number BUS# 611 and an actual transaction amount of money T-AMOUNT 612 necessary to perform the financial transaction. Those are added to the authorization process for accounting processing at the back office during the accounting session.

At decision-making Step 704, ACCOUNT NUMBER SEARCH PROGRAM module 502 is activated, once a party at the point of sale sends the ACC_{XYZ} 601 and it is received at the financial institution back office. Then module 502 performs two steps, provided ACC#_{XYZ} 601 is a legitimate one (positively verified at the back office dB). Module 502 activates AUTHORIZATION FILE GENERATOR module 903 at the time moment TX2, which actually symbolizes the beginning of the authorization session at the financial institution back office. Module 903 creates the authorization record with the file name ACC#_{XYZ}_TX2 906 in the back office dB, and is kept active during the time when all authorization session entry information is passing through steps 706-708-709 and eventually gathered together in the authorization record ACC#_{XYZ} TX2. In the second step, module 502 transitions the authorization session to decision-making step 706, provided again the account number 601 is positively verified at the back office dB. Otherwise, the authorization session is denied through dedicated device 701 at the financial institution back office, notifying a party at the point of sale with the error message of an incorrect account number.

WATCH DOG PROGRAM module 901 activated at the moment TX1 keeps periodically searching the back office dB. It is looking for the authorization record, which complements to the authentication record ACC# {XYZ}_TX1 and, once the authorization record ACC#{XYZ}_TX2 is created, module 901 eventually finds it. If the authorization record is created during the time interval TX1<t<TX1+T_INT, the authorization session is continuing. Otherwise, it is denied. WATCHDOG PROGRAM module 901 right after the authorization file is found and positively identified with respect to the time it is created, activates TRANSACTION SIGNATURE VERIFICATION PROGRAM module 703, ACCOUNTING SESSION VERIFICATION PROGRAM module 707 and BUSINESS ID VERIFICATION PROGRAM module 705. All these modules start processing information they are looking for in the authorization record or keep periodically looking at this record, until the expected information appears there after steps 706-708-709.

At decision-making step (W/D)#_GEN 706 the financial transaction alphanumeric signature is already transferred from a party at the point of sale to the back office and module 703 is activated (if it is not activated yet by module 901) and compares alphanumeric signatures in the authentication record and the authorization record. In case they match, module 703 transitions the authorization session to decision-making step BUS# 708. Otherwise, the authorization session is denied with the error message that the transaction signature is incorrect.

At decision-making step BUS# 708, business ID BUS# 611 is already transferred from a party at the point of sale to the back office and BUSINESS ID VERIFICATION PROGRAM module 705 is activated unless it was already activated by module 901. Module 705 checks whether a party at the point of sale BUS# is on the list of valid, legal merchants and then transitions the authorization session to decision-making step T-AM 709. Otherwise, the authorization session is denied with the error message that the merchant ID is incorrect.

At decision-making step T-AM 709, a specified exact transaction amount of money T-AMOUNT 612 transferred from a party at the point of sale to the financial institution back office, is written to the authorization record 906 and ACCOUNTING SESSION VERIFICATION PROGRAM module 707 is activated, unless it was already activated by module 901. Module 707 reads out T-AMOUNT from the authorization record 906 and checks whether it is less or equal to the withdraw or deposit amount (W/D)$ specified in the authentication record 907. If T-AMOUNT is less or equal (=<) (W/D)$ (T-AMOUNT=<(W/D)$), module 707 locks T-AMOUNT at the account to assure the payment to a party at the point of sale (after deductions of the transaction fee to the card issuing bank and the discount rate to the acquiring bank or an independent sales organization). This completes the accounting session, which was performed after the authorization session.

If modules 502 and 703 positively identify a financial transaction after comparing authorization record 906 and authentication record 907 at decision-making step T-SIGN VERIF 908, the authorization session is transitioned to decision-making step 306. Otherwise, the authorization session is denied through dedicated device/channel 701 at the financial institution back office.

At decision making step ACC-VERIF 306, the accounting session gets completed and the financial transaction is permitted, provided modules 705 and 707 positively identified BUS# 611 and T-AMOUNT 612 at the back office dB. Otherwise, the financial transaction is denied. As can be seen, a successful completion of the accounting session is an essential part of the authorization process. The authorization code is sent to the account holder through a dedicated device or channel 909 from the financial institution back office, provided the accounting session is successfully completed and the account is not on a list of lost, stolen or fraudulently used accounts. This allows checking again to insure that no suspicious issues related to this particular account have arisen since the authentication session was completed. Authentication and authorization records are kept in the back office dB for ongoing accounting control until they are archived.

Several notes about the "clocked" AAA technology at the back office described above follow. First, a technique for performing chargeback using this technology is described. Chargeback is a credit card transaction that is billed back to a party at the point of sale, who made the sale. This occurs when the account holder disputes a charge on their bill by claiming the product was never delivered or because the account holder was dissatisfied with the product in some way. If a party at the point of sale and the account holder agree with the chargeback and its amount, the account holder requests the back office to authenticate a deposit financial transaction using D_PIN secret number during the authentication session (instead of the usually used W_PIN for buy/sell transactions). Then the account holder submits the alphanumeric signature along with the account number to a party at the point of sale. In other words, chargeback is performed as a regular financial transaction with the only difference being that the transaction signature generated at the back office is for a deposit transaction. Then a party at the point of sale requests the back office to authorize this financial transaction in the same way as a withdraw financial transaction. Once the transaction is authorized at the financial institution back office, a request to lock the chargeback amount is sent to the acquiring bank or an independent sales organization, where this merchant account resides in order to guarantee the payment back to the account holder. The chargeback mechanism enables the chargeback transaction within the standard EPSL architecture (referring back to FIG. 3) without disclosing personal information about the account holder to a party at the point of sale.

The back office "clocked" AAA technology is adapted to service a party at the point of sale during authorization sessions independent of the flow rate for data entry on particular devices and/or communication lines. In an extreme case, when a party at the point of sale enters ACC#_{XYZ}, (W/D)#_GEN, BUS# and T-AMOUNT manually, modules 703, 705 and 707 are activated by module 901, once module 502 verifies ACC#_{XYZ} and the authorization record ACC#_{XYZ}_TX2 906 is created in the back office dB. This file can be empty for a while, until the parameters are entered. Until then each of the mentioned modules 703, 705 and 707 periodically looks at the authorization file, and picks up the parameter of interest as soon as it arrives at the back office and is written into the authorization file. Alternatively, in the case that a party at the point of sale uses a specialized point-of-sale POS device, which allows for high speed electronic data entry for the parameters listed above, modules 703, 705 and 707 will find needed parameters in the authorization file ACC#_{XYZ}_TX2 at the very first moment they were activated. In this case, modules 703, 705 and 707 could be activated by decision-making routines 706, 708 and 709 sooner than by module 901. That depends on the specifics of hardware and software implementation of the "clocked" AAA technology at the financial institution back office. Summarizing, it can be said that processing time for an authorization session is not limited by the back office "clocked" AAA technology, but rather by the entry data flow rate by a party at the point of sale locations.

Authentication sessions in EPSL "clocked" AAA technology are not time limited. Also, the authentication sessions include an interactive communication session between the account holder and the financial institution back office, which constitutes the third security protection tier, and therefore cannot be replaced by an automated electronic interaction between account holder devices (for instance, smart cards or mobile phones) and the financial institution back office. This is a trade off in the EPSL technology between security protection and inconvenience in using this technique. Fortunately, authentication sessions in the EPSL technology are performed prior to a financial transaction, and the account holder can choose a time, when he/she is comfortable, to get the transaction signature from the financial institution back office. The way the account holder keeps the transaction signature after the authentication session is completed and before it is submitted to a party at the point of sale can vary. It can range from just writing it down into a notebook, to storing it electronically inside devices like smart cards, digital personal organizers with wireless connection capabilities and other electronic devices with read/write memory capabilities.

Smart card technology is an excellent tool to make EPSL technology more comfortable for the account holder and the third party at the point of sale. Smart cards can be used as intermediate information carriers between the financial institution back office, which will write the transaction signatures into smart cards during authentication sessions, and the account holder. Then the transaction signature can be read out from the smart card at the point of sale locations to speed up the authorization sessions. This way there are no issues with smart card security protection, since they can not be reused. Even if a smart card is lost or stolen before the current financial transaction signature was deactivated during an expected financial transaction at the point of sale location, nobody knows what was the predicted transaction amount (W/D)$ requested and how close the transaction signature is to its lifetime end. Moreover, even the fact that the card may still carry a signature is not apparent. Therefore, chances are high that even in this case fraudulent actions will be unsuccessful. More than that, a smart card may not contain the account number. For example, the account number may be carried on an EPSL membership card. In this case, smart cards have absolute security protection against fraudulent actions at any time.

Mobile phones, network computers or other portable electronic devices having information read/write capabilities can be made as convenient as smart cards, functioning as intermediate authentication information carriers for one specific financial transaction (financial transaction alphanumeric signatures) between the back office and a party at the point of sale.

The last note relates to utilizing the EPSL architecture with "clocked" AAA technology at ATM stations. An account holder can perform an authentication session for a withdraw transaction either before or during operations at ATM stations. In any event, once the authentication session with the back office is completed, the account holder operates at an ATM station as the point of sale location, provided the ATM station hardware and software are altered to perform authorization requests in the EPSL architecture. This makes money withdraw sessions at ATM stations highly secured and protected against information to be looked after, stolen or fraudulently used, while preserving complete privacy of personal information.

Finally, it should be emphasized that the described innovation can be used on-line and off-line, and for private and non-private sessions, in all cases for a highly secure financial transaction. If an account holder is not concerned with transaction privacy, the account holder name can be placed on the card and become one more parameter utilized in the "clocked" AAA technology. Meanwhile, use of the EPSL architecture and the "clocked" AAA technology for non-private financial transactions provides improved (essentially, "bullet proof") security for on-line and off-line transactions. The entire EPSL architecture and the "clocked" AAA at the back office for non-private financial transactions can be viewed as a fourth security tier. In a case of private transactions, it acts as a fourth security tier as well as the main embedded privacy layer.

Though the invention has been described in connection with preferred embodiments of the system and method for private and secure transactions, it is understood that the preferred embodiments have been used for the purpose of illustrating the manner in which the invention may be made and used. It should also be understood that implementation of other variations and modifications of the invention and its various aspects will be apparent to those skilled in the art, and that the invention is not limited to these preferred embodiments described above. The present invention is therefore contemplated to cover any and all modifications, variations, or equivalents that fall within the true spirit and scope of the basic underlying principles disclosed hereinafter by the claims.

I claim:

1. A computer implemented method for server-side execution in support of financial transactions, comprising:

establishing an authentication record in memory accessible by server-side computer resources, in response to communications at a first time from a particular account holder, for a predicted transaction by the particular account holder, the authentication record for the predicted transaction includes a predicted transaction amount, a transaction time parameter, and an authenticated transaction signature for presentation upon execution of the predicted transaction, and sending a message including the authenticated transaction signature from the server-side computer resources to the particular account holder;

establishing an authorization record in memory accessible by server-side computer resources, in response to communications at a second time from a party to a particular transaction, for the particular transaction indicating an actual transaction amount, an actual transaction time and a presented transaction signature, wherein said establishing an authorization record does not require identification of the particular account holder;

reading and processing the authorization record and the authentication record in the server-side computer resources, and if the presented transaction signature in the authorization record matches the authenticated transaction signature in the authentication record for the predicted transaction, the actual transaction amount in the authorization record matches the predicted transaction amount in the authentication record and the actual transaction time in the authorization record matches the transaction time parameter in the authentication record, then sending an authorization message to the party of the particular transaction; and performing an accounting process, including reconciling the predicted transaction amount and the actual transaction amount in the server-side computer resources, for the particular account holder.

2. The method of claim 1, including:

storing the authentication record in a database including a plurality of authentication records for other predicted transactions.

3. The method of claim 1, wherein the time parameter comprises a time value indicating the first time, when the authorization record was created.

4. The method of claim 1, wherein said matching includes determining whether the actual transaction time falls within a time interval indicated by the transaction time parameter.

5. The method of claim 1, wherein establishing an authentication record includes:

establishing a communication session with the particular account holder;

accepting an account number and an identification number for the particular account holder via the communication session;

accepting the predicted transaction amount via the communication session; and producing the transaction signature.

6. The method of claim 5, including prompting the particular account holder to supply a combination of digits from a personal identification code, wherein the combination does not include all of the personal identification code.

7. The method of claim 1, wherein establishing an authorization record includes:

establishing a communication session with the party to the particular transaction; and accepting the presented transaction signature and the actual transaction amount via the communication session.

8. The method of claim 7, including accepting identification of the party via the communication session.

9. The method of claim 8, including maintaining a list of authorized parties, and including determining whether the identification of the party accepted via the communication session indicates a party in the list of authorized parties.

10. The method of claim 1, wherein establishing an authentication record includes:

establishing a communication session with the particular account holder;

accepting an account number via the communication session;

prompting the particular account holder via the communication session to supply a static identification number and a dynamically identified combination of digits from a personal identification code, wherein the combination does not include all of the personal identification code;

accepting the predicted transaction amount via the communication session; and producing the transaction signature and sending the transaction signature to the particular account holder.

* * * * *

UNITED STATES PATENT AND TRADEMARK OFFICE
CERTIFICATE OF CORRECTION

| | | |
|---|---|---|
| PATENT NO. | : 7,379,916 B1 | Page 1 of 1 |
| APPLICATION NO. | : 09/706370 | |
| DATED | : May 27, 2008 | |
| INVENTOR(S) | : Len L. Mizrah | |

It is certified that error appears in the above-identified patent and that said Letters Patent is hereby corrected as shown below:

On the Title page of the patent, in the Title, item (54), line 1, after the word "PRIVATE" insert -- AND --.

In the Title, column 1, line 1, after the word "PRIVATE" insert -- AND --.

Signed and Sealed this

Tenth Day of November, 2009

David J. Kappos
*Director of the United States Patent and Trademark Office*